UNITED STATES PATENT OFFICE.

EDGAR W. SNYDER, OF LOS ANGELES, CALIFORNIA.

CHEWING-GUM.

1,239,313.  Specification of Letters Patent.  Patented Sept. 4, 1917.

No Drawing.  Application filed May 31, 1917. Serial No. 172,015.

*To all whom it may concern:*

Be it known that I, EDGAR W. SNYDER, a citizen of the United States, residing at Los Angeles, in the county of Los Angeles and State of California, have invented certain new and useful Improvements in Chewing-Gum, of which the following is a specification.

My invention relates to improvements in chewing gum, and has particular reference to the use of ocotilla (*Fouquieria splendens*) gum as a constituent or base of chewing gum.

While I prefer to use the ocotilla gum in combination with other ingredients, it may be employed alone, as a chewing gum, with or without added flavoring, with some degree of success.

The ocotilla gum, after extraction from the ocotilla plant assumes a very adhesive condition. When first extracted, it has a pale green color, but subsequently this color changes to a darker green. When combined with other gums, it mixes very thoroughly, without streaking, and improves with age. The ocotilla gum does not oxidize readily.

This gum is obtained from the ocotilla plant, the botanical name of which is *Fouquieria splendens*. This plant is a vigorous grower and is one of the hardiest of the desert flora. It grows abundantly within regions of low precipitation, other climatic conditions and the character of the soil being right. In fact, it seems to thrive just as well on the extremely arid area as it does elsewhere within the semi-tropical desert localities. It is therefore generally found in great abundance on the lands that are utterly valueless for any purpose except the cultivation of this valuable shrub.

When the branches are cut off a few inches above the base of the bush, new sprouts put forth, and continue to grow until cut again.

In preparing my improved chewing gum, I preferably employ 75 parts by weight of ocotilla gum, that is a gum obtained from the ocotilla plant, 5 parts by weight of preferably pulverized sugar, 15 parts by weight of hydrocarbon or mineral rubber, and 5 parts by weight of extract of licorice.

The several ingredients are thoroughly mixed or kneaded, and rolled into a thin layer, subsequent to which it is cut into the desired shapes or sizes.

To the above composition may be added chicle or other kindred gums.

I wish it understood that all of the ingredients, except the ocotilla gum, may be dispensed with, with some degree of success.

It is to be understood that the form of my invention herewith shown and described is to be taken as a preferred example of the same, and that various changes may be resorted to in the proportions of the several ingredients, and that all of the ingredients, excepting the ocotilla gum, may be dispensed with without departing from the spirit of my invention or the scope of the subjoined claims.

Having thus described my invention, I claim:

1. A chewing gum comprising ocotilla gum.

2. A chewing gum having a base formed of ocotilla gum.

3. A chewing gum comprising, rubber, a flavoring material, and ocotilla gum, the ocotilla gum being present in a preponderance by weight.

4. A chewing gum comprising, rubber, sugar, ocotilla gum, and extract of licorice.

In testimony whereof I affix my signature in presence of two witnesses.

EDGAR W. SNYDER.

Witnesses:
R. N. CORNWELL,
CHAS. F. JENKINS.